United States Patent
Takahashi et al.

(10) Patent No.: US 10,351,793 B2
(45) Date of Patent: Jul. 16, 2019

(54) REFRIGERATOR OIL AND WORKING FLUID COMPOSITION FOR REFRIGERATORS

(71) Applicant: JXTG Nippon Oil & Energy Corporation, Chiyoda-ku, Tokyo (JP)

(72) Inventors: Hitoshi Takahashi, Tokyo (JP); Takeshi Okido, Tokyo (JP); Souichirou Konno, Tokyo (JP)

(73) Assignee: JXTG Nippon Oil & Energy Corporation, Tokyo (JP)

( * ) Notice: Subject to any disclaimer, the term of this patent is extended or adjusted under 35 U.S.C. 154(b) by 96 days.

(21) Appl. No.: 15/550,177

(22) PCT Filed: Feb. 10, 2016

(86) PCT No.: PCT/JP2016/054018
§ 371 (c)(1),
(2) Date: Aug. 10, 2017

(87) PCT Pub. No.: WO2016/133001
PCT Pub. Date: Aug. 25, 2016

(65) Prior Publication Data
US 2018/0023025 A1 Jan. 25, 2018

(30) Foreign Application Priority Data

Feb. 20, 2015 (JP) .................................. 2015-032161
Nov. 5, 2015 (JP) .................................. 2015-217634

(51) Int. Cl.
| | | |
|---|---|---|
| *C10M 169/04* | (2006.01) | |
| *C10M 105/38* | (2006.01) | |
| *C10M 129/18* | (2006.01) | |
| *C10M 129/66* | (2006.01) | |
| *C09K 5/04* | (2006.01) | |
| *C10M 105/34* | (2006.01) | |
| *C10M 171/00* | (2006.01) | |

(52) U.S. Cl.
CPC .......... *C10M 169/04* (2013.01); *C09K 5/045* (2013.01); *C10M 105/34* (2013.01); *C10M 105/38* (2013.01); *C10M 129/18* (2013.01); *C10M 129/66* (2013.01); *C10M 171/008* (2013.01); *C09K 5/04* (2013.01); *C09K 2205/122* (2013.01); *C09K 2205/24* (2013.01); *C10M 2207/042* (2013.01); *C10M 2207/28* (2013.01); *C10M 2207/2815* (2013.01); *C10M 2207/2835* (2013.01); *C10N 2230/08* (2013.01); *C10N 2240/30* (2013.01)

(58) Field of Classification Search
CPC .......... C10M 169/04; C10M 105/34; C10M 105/38; C10M 129/18; C10M 129/68; C10M 2207/2835
See application file for complete search history.

(56) References Cited

U.S. PATENT DOCUMENTS

| | | | | |
|---|---|---|---|---|
| 5,498,356 A | * | 3/1996 | Kamakura ........... | C10M 133/22 508/495 |
| 5,620,950 A | * | 4/1997 | Kamakura ........... | C10M 129/18 508/485 |
| 5,653,909 A | * | 8/1997 | Muraki ................ | C10M 169/04 252/68 |
| 6,267,906 B1 | * | 7/2001 | Schnur .................. | C09K 5/045 252/68 |
| 2011/0240910 A1 | * | 10/2011 | Carr .................... | C10M 171/008 252/68 |
| 2016/0376485 A1 | * | 12/2016 | Benanti ................. | C09K 5/045 252/68 |

FOREIGN PATENT DOCUMENTS

| | | |
|---|---|---|
| CN | 1930276 A | 3/2007 |
| JP | S62-292895 A | 12/1987 |
| JP | H3-227397 A | 10/1991 |
| JP | H04-314796 A | 11/1992 |
| JP | H04-314797 A | 11/1992 |
| JP | H06-088087 A | 3/1994 |
| JP | H06-240278 A | 8/1994 |
| JP | H8-503975 A | 4/1996 |
| JP | H08-151590 A | 6/1996 |
| JP | 2002-129178 A | 5/2002 |
| JP | 2015-014395 * | 1/2015 |
| JP | 2015-014395 A | 1/2015 |
| WO | WO 93/024585 A1 | 12/1993 |
| WO | WO 2012/086518 A1 | 6/2012 |
| WO | WO 2016/132999 A1 | 8/2016 |

(Continued)

OTHER PUBLICATIONS

International Bureau of WIPO, International Preliminary Report on Patentability issued in International Application No. PCT/JP2016/054018 (dated Aug. 31, 2017).
International Bureau of WIPO, International Preliminary Report on Patentability issued in International Application No. PCT/JP2016/054008 (dated Aug. 31, 2017).
International Bureau of WIPO, International Preliminary Report on Patentability issued in International Application No. PCT/JP2016/054009 (dated Aug. 31, 2017).
Japan Patent Office, International Search Report issued in International Application No. PCT/JP2016/054018 (dated Mar. 8, 2016).
Taiwanese Intellectual Property Office, Office Action issued in Taiwanese Application No. 105104789 (dated Oct. 24, 2016).
Japan Patent Office, Office Action issued in Japanese Application No. 2017-500639 (dated Mar. 19, 2019).
Japan Patent Office, Office Action issued in Japanese Application No. 2017-500637 (dated Mar. 19, 2019).

* cited by examiner (Continued)

*Primary Examiner* — John R Hardee
(74) *Attorney, Agent, or Firm* — Leydig, Voit & Mayer, Ltd.

(57) ABSTRACT

The present invention provides a refrigerating machine oil comprising: a base oil containing an ester of dipentaerythritol with 2-methylbutanoic acid and n-pentanoic acid; and at least one epoxy compound selected from the group consisting of a glycidyl ester compound and a glycidyl ether compound, the refrigerating machine oil being used with a difluoromethane refrigerant.

14 Claims, No Drawings

REFRIGERATOR OIL AND WORKING FLUID COMPOSITION FOR REFRIGERATORS

CROSS-REFERENCE TO RELATED APPLICATIONS

This patent application is the U.S. national phase of International Application No. PCT/JP2016/054018, filed on Feb. 10, 2016, which claims the benefit of Japanese Patent Application No. 2015-217634, filed Nov. 5, 2015, and Japanese Patent Application No. 2015-032161, filed Feb. 20, 2015, the disclosures of which are incorporated herein by reference in their entireties for all purposes.

TECHNICAL FIELD

The present invention relates to a refrigerating machine oil and a working fluid composition for a refrigerating machine.

BACKGROUND ART

Refrigerating machines such as refrigerators, car air-conditioners, room air-conditioners, and automatic vending machines have a compressor for circulating a refrigerant in a refrigeration cycle. The compressor is charged with a refrigerating machine oil for lubricating a sliding part. The refrigerating machine oil is used in the refrigeration cycle in the coexistence of a refrigerant at a wide range of temperatures from low to high temperatures and, therefore, the refrigerating machine oil is required to have various properties such as: lubricity, and thermal and chemical stability, in the presence of the refrigerant; compatibility with the refrigerant; and low-temperature properties. Such properties of a refrigerating machine oil may show unpredictable behaviors depending on the kind of the coexisting refrigerant; thus, development of a refrigerating machine oil is necessary for each refrigerant.

For example, Patent Literature 1 discloses a polyolester oil and polyvinyl ether oil having predetermined properties as refrigerating machine oils that improve wear resistance in the presence of a difluoromethane refrigerant.

CITATION LIST

Patent Literature

Patent Literature 1: International Publication No. WO 2012/086518

SUMMARY OF INVENTION

Technical Problem

An object of the present invention is to provide a refrigerating machine oil and a working fluid composition for a refrigerating machine that can exhibit both good low-temperature deposition property and high thermal and chemical stability.

Solution to Problem

The present inventors first studied the factors influencing the low-temperature deposition property and thermal and chemical stability of a refrigerating machine oil. As a result, the present inventors have found that an acid scavenger used for improvement in thermal and chemical stability can influence the low-temperature deposition property, and that the thermal and chemical stability as well as the low-temperature deposition property can change depending on the types of the base oil and acid scavenger.

In consequence of a further study based on the above findings, the present inventors have found that combining a predetermined base oil and a predetermined acid scavenger makes it possible to achieve both good low-temperature deposition property and high thermal and chemical stability of a refrigerating machine oil, and have completed the present invention.

That is, the present invention provides a refrigerating machine oil comprising: a base oil comprising an ester of dipentaerythritol with 2-methylbutanoic acid and n-pentanoic acid; and at least one epoxy compound selected from the group consisting of a glycidyl ester compound and a glycidyl ether compound, the refrigerating machine oil being used with a difluoromethane refrigerant.

It is preferable that a ratio of the ester in the base oil be 30% by mass or more and 100% by mass or less.

It is preferable that a content of the epoxy compound be 0.01% by mass or more and 5.0% by mass or less based on a total amount of the refrigerating machine oil.

The present invention also provides a working fluid composition for a refrigerating machine comprising the above refrigerating machine oil and a difluoromethane refrigerant.

Advantageous Effects of Invention

According to the present invention, a refrigerating machine oil and a working fluid composition for a refrigerating machine that can exhibit both good low-temperature deposition property and high thermal and chemical stability can be provided.

DESCRIPTION OF EMBODIMENTS

Embodiments of the present invention will be described below in detail.

The refrigerating machine oil comprises: a base oil containing an ester of dipentaerythritol with 2-methylbutanoic acid and n-pentanoic acid; and at least one epoxy compound selected from the group consisting of a glycidyl ester compound and a glycidyl ether compound.

The base oil contains an ester of dipentaerythritol with 2-methylbutanoic acid and n-pentanoic acid. The ester can be obtained, for example, by reacting dipentaerythritol with an acid mixture of 2-methylbutanoic acid and n-pentanoic acid. The molar ratio between 2-methylbutanoic acid and n-pentanoic acid (2-methylbutanoic acid:n-pentanoic acid) in fatty acids constituting the ester is preferably from 9:1 to 1:9, more preferably from 8:2 to 2:8, and further preferably from 7:3 to 3:7, from the viewpoint of more superior low-temperature deposition property.

The base oil may further contain another base oil in addition to the ester of dipentaerythritol with 2-methylbutanoic acid and n-pentanoic acid. Examples of the other base oil include: hydrocarbon oils such as mineral oils, olefin polymers, naphthalene compounds, and alkylbenzenes; and oxygen-containing synthetic oils such as esters other than the above ester, polyglycols, polyvinyl ethers, ketones, polyphenyl ethers, silicones, polysiloxanes, and perfluoroethers. The oxygen-containing synthetic oil is preferably an ester other than the above ester, a polyglycol, and a polyvinyl ether, and is more preferably an ester other than the above ester.

The ester other than the above ester is preferably an ester of a polyhydric alcohol and a fatty acid. The polyhydric alcohol constituting the ester is, for example, a polyhydric alcohol having 2 to 6 hydroxy groups, and is preferably a hindered alcohol such as neopentyl glycol, trimethylolethane, trimethylolpropane, trimethylolbutane, di-(trimethylolpropane), tri-(trimethylolpropane), pentaerythritol, or dipentaerythritol. The polyhydric alcohol is more preferably pentaerythritol, because it is especially superior in compatibility with a refrigerant and hydrolysis stability.

The fatty acid constituting the ester is preferably a saturated fatty acid. The number of carbon atoms of the fatty acid is preferably from 4 to 20, more preferably from 4 to 18, further preferably from 4 to 9, and especially preferably from 5 to 9. Examples of C4 to C20 fatty acids include butanoic acid, pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, and icosanoic acid. These C4 to C20 fatty acids may be linear or branched and are preferably branched. The C4 to C20 branched fatty acid is preferably a fatty acid branched at a position and/or β position, and is more preferably 2-methylpropanoic acid, 2-methylbutanoic acid, 2-methylpentanoic acid, 2-methylhexanoic acid, 2-ethylpentanoic acid, 2-methylheptanoic acid, 2-ethylhexanoic acid, 3,5,5-trimethylhexanoic acid, or 2-ethylhexadecanoic acid, and is further preferably 2-ethylhexanoic acid or 3,5,5-trimethylhexanoic acid.

The ratio of the ester of dipentaerythritol with 2-methylbutanoic acid and n-pentanoic acid in the base oil is preferably 10% by mass or more, more preferably 20% by mass or more, further preferably 30% by mass or more, especially preferably 40% by mass or more, and most preferably 50% by mass or more from the viewpoint of more superior low-temperature deposition property, and may be 100% by mass or less. The ratio of the ester of dipentaerythritol with 2-methylbutanoic acid and n-pentanoic acid in the base oil means the ratio of the total amount of an ester in which both 2-methylbutanoic acid and n-pentanoic acid are bonded to one dipentaerythritol molecule and an ester in which either 2-methylbutanoic acid or n-pentanoic acid is bonded to one dipentaerythritol molecule to the total amount of the base oil.

The content of the base oil may be preferably 50% by mass or more, more preferably 70% by mass or more, and further preferably 90% by mass or more based on the total amount of the refrigerating machine oil.

The kinematic viscosity of the base oil at 40° C. may be preferably 3 mm²/s or more, more preferably 4 mm²/s or more, and further preferably 5 mm²/s or more, and may be preferably 1000 mm²/s or less, more preferably 500 mm²/s or less, and further preferably 400 mm²/s or less. The kinematic viscosity of the base oil at 100° C. may be preferably 1 mm²/s or more and more preferably 2 mm²/s or more, and may be preferably 100 mm²/s or less and more preferably 50 mm²/s or less. A kinematic viscosity as used herein means a kinematic viscosity measured according to JIS K 2283: 2000.

The refrigerating machine oil comprises one or more epoxy compounds selected from glycidyl ester compounds and glycidyl ether compounds. An example of the glycidyl ester compound (which may be referred to as "glycidyl ester type epoxy compound") is a compound represented by the following formula (1). An example of the glycidyl ether compound (which may be referred to as "glycidyl ether type epoxy compound") is a compound represented by the following formula (2).

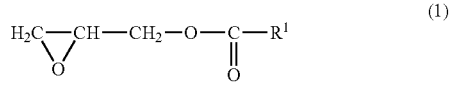

(In the formula (1), $R^1$ represents an aryl group, an alkyl group, or an alkenyl group.)

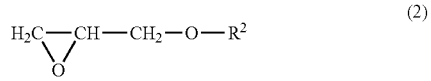

(In the formula (2), $R^2$ represents an aryl group or an alkyl group.)

The number of carbon atoms of the aryl group, alkyl group, and alkenyl group represented by $R^1$ and the number of carbon atoms of the aryl group and alkyl group represented by $R^2$ are preferably from 5 to 18. When the number of carbon atoms is 5 or more, sufficient stability of the epoxy compounds is ensured, and decomposition prior to reaction with water, a fatty acid, or an oxidatively degraded product, or self-polymerization in which the epoxy compounds polymerize with each other, can be prevented so that the desired functions can easily be obtained. In addition, when the number of carbon atoms is 18 or less, the solubility in a refrigerant is maintained so well that the Presence of defects such as poor cooling due to deposition in a refrigerating apparatus can be reduced.

Preferred as the glycidyl ester type epoxy compound represented by the formula (1) are glycidyl benzoate, glycidyl neodecanoate, glycidyl 2,2-dimethyloctanoate, glycidyl acrylate, and glycidyl methacrylate.

Preferred as the glycidyl ether type epoxy compound represented by the formula (2) are n-butylphenyl glycidyl ether, i-butylphenyl glycidyl ether, sec-butylphenyl glycidyl ether, tert-butylphenyl glycidyl ether, pentylphenyl glycidyl ether, hexylphenyl glycidyl ether, heptylphenyl glycidyl ether, octylphenyl glycidyl ether, nonylphenyl glycidyl ether, decylphenyl glycidyl ether, decyl glycidyl ether, undecyl glycidyl ether, dodecyl glycidyl ether, tridecyl glycidyl ether, tetradecyl glycidyl ether, and 2-ethylhexyl glycidyl ether.

The glycidyl ether type epoxy compound may be, for example, neopentyl glycol diglycidyl ether, trimethylolpropane triglycidyl ether, pentaerythritol tetraglycidyl ether, 1,6-hexanediol diglycidyl ether, sorbitol polyglycidyl ether, polyalkylene glycol monoglycidyl ether, and polyalkylene glycol diglycidyl ether, rather than the epoxy compound represented by the formula (2).

The content of the epoxy compounds (the total amount of the glycidyl ester compound and the glycidyl ether compound) is preferably 0.01% by mass or more, more preferably 0.05% by mass or more, and further preferably 0.1% by mass or more based on the total amount of the refrigerating machine oil from the viewpoint of stability, and is preferably 10.0% by mass or less, more preferably 7.0% by mass or less, and further preferably 5.0% by mass or less based on the total amount of the refrigerating machine oil from the viewpoint of lubricity. The content of the epoxy compounds is preferably from 0.01 to 10.0% by mass, from 0.01 to 7.0% by mass, from 0.01 to 5.0% by mass, from 0.05 to 10.0% by mass, from 0.05 to 7.0% by mass, from 0.05 to 5.0% by mass, from 0.1 to 10.0% by mass, from 0.1 to 7.0% by mass, or from 0.1 to 5.0% by mass from the viewpoint of good balance between stability and lubricity.

The refrigerating machine oil may further contain another additive in addition to the glycidyl ester compound and glycidyl ether compound. Examples of the other additive include: phenolic antioxidants such as 2,6-di-tert-butyl-p-cresol and bisphenol A; amine antioxidants such as phenyl-α-naphthylamine and N,N-di(2-naphthyl)-p-phenylenediamine; extreme-pressure agents such as chlorinated paraffin, phosphorus compounds, and sulfur compounds; oily agents such as fatty acids; antifoaming agents such as those based on silicones; metal deactivators such as benzotriazole; antiwear agents; viscosity index improving agents; pour-point depressants; and detergent dispersants. The content of these additives may be preferably 10% by mass or less and more preferably 5% by mass or less based on the total amount of the refrigerating machine oil.

The kinematic viscosity of the refrigerating machine oil at 40° C. is preferably 3 mm$^2$/s or more, more preferably 4 mm$^2$/s or more, and further preferably 5 mm$^2$/s or more from the viewpoint of superior lubricity. The kinematic viscosity of the refrigerating machine oil at 40° C. is preferably 1000 mm$^2$/s or less, more preferably 500 mm$^2$/s or less, and further preferably 400 mm$^2$/s or less from the viewpoint of superior oil return performance. The kinematic viscosity of the refrigerating machine oil at 40° C. is preferably from 3 to 1000 mm$^2$/s, from 3 to 500 mm$^2$/s, from 3 to 400 mm$^2$/s, from 4 to 1000 mm$^2$/s, from 4 to 500 mm$^2$/s, from 4 to 400 mm$^2$/s, from 5 to 1000 mm$^2$/s, from 5 to 500 mm$^2$/s, or from 5 to 400 mm$^2$/s from the viewpoint of good balance between lubricity and oil return performance.

The kinematic viscosity of the refrigerating machine oil at 100° C. is preferably 1 mm$^2$/s or more and more preferably 2 mm$^2$/s or more from the viewpoint of superior lubricity. The kinematic viscosity of the refrigerating machine oil at 100° C. is preferably 100 mm$^2$/s or less and more preferably 50 mm$^2$/s or less from the viewpoint of superior oil return performance. The kinematic viscosity of the refrigerating machine oil at 100° C. is preferably from 1 to 100 mm$^2$/s, from 1 to 50 mm$^2$/s, from 2 to 100 mm$^2$/s, or from 2 to 50 mm$^2$/s from the viewpoint of good balance between lubricity and oil return performance.

The volume resistivity of a refrigerating machine oil is preferably 1.0×10$^{10}$ Ω·cm or more, more preferably 1.0×10$^{11}$ Ω·cm or more, and further preferably 1.0×10$^{12}$ Ω·cm or more. Especially, when a refrigerating machine oil is used in a closed refrigerating machine, a high electrical insulation tends to be required. A volume resistivity as used herein means a volume resistivity measured at 25° C. according to JIS C2101: 1999.

The moisture content of the refrigerating machine oil is preferably 300 ppm or less, more preferably 200 ppm or less, and further preferably 100 ppm or less based on the total amount of the refrigerating machine oil. Especially, when a refrigerating machine oil is used in a closed refrigerating machine, a low moisture content is required from the viewpoints of the thermal and chemical stability of a refrigerating machine oil, or influence on electrical insulation.

The acid value of the refrigerating machine oil is preferably 0.1 mg KOH/g or less and more preferably 0.05 mg KOH/g or less. The hydroxyl value of the refrigerating machine oil is preferably 5.0 mg KOH/g or less and more preferably 2.0 mg KOH/g or less. When the acid value and hydroxyl value of the refrigerating machine oil satisfy the above conditions, corrosion of a metal used in the refrigerating machine or pipes can be prevented more reliably. An acid value as used herein means an acid value measured according to JIS K 2501: 2003. A hydroxyl value as used herein means a hydroxyl value measured according to JIS K 0070-1992.

The ash content of the refrigerating machine oil is preferably 100 ppm or less and more preferably 50 ppm or less from the viewpoint of enhancing the thermal and chemical stability of the refrigerating machine oil to prevent formation of sludge or the like. An ash content as used herein means an ash measured according to JIS K 2272: 1998.

The pour point of a refrigerating machine oil may be preferably −10° C. or less, more preferably −20° C. or less, and further preferably −30° C. or less. A pour point as used herein means a pour point measured according to JIS K2269:1987.

The refrigerating machine oil according to the present embodiment is used in combination with a difluoromethane refrigerant (HFC-32). The working fluid composition for a refrigerating machine according to the present embodiment contains the above refrigerating machine oil and a difluoromethane refrigerant.

That is, a composition containing an ester of dipentaerythritol with 2-methylbutanoic acid and n-pentanoic acid and at least one epoxy compound selected from the group consisting of a glycidyl ester compound and a glycidyl ether compound is favorably utilized as a constituent of a refrigerating machine oil to be used in combination with a difluoromethane refrigerant or as a constituent of a working fluid composition for a refrigerating machine containing a refrigerating machine oil and a difluoromethane refrigerant. A composition containing an ester of dipentaerythritol with 2-methylbutanoic acid and n-pentanoic acid and at least one epoxy compound selected from the group consisting of a glycidyl ester compound and a glycidyl ether compound is favorably utilized in production of a refrigerating machine oil to be used in combination with a difluoromethane refrigerant or in production of a working fluid composition for a refrigerating machine containing a refrigerating machine oil and a difluoromethane refrigerant.

The refrigerant may consist of difluoromethane and may contain another refrigerant in addition to difluoromethane. Examples of the other refrigerant include: saturated hydrofluorocarbon refrigerants other than difluoromethane; unsaturated hydrofluorocarbon refrigerants; fluorine-containing ether refrigerants such as perfluoroethers; bis(trifluoromethyl)sulfide refrigerants; trifluoroiodomethane refrigerants; and natural refrigerants such as dimethyl ether, carbon dioxide, ammonia, and hydrocarbons.

The saturated hydrofluorocarbon refrigerants other than difluoromethane include pentafluoroethane (HFC-125), 1,1,2,2-tetrafluoroethane (HFC-134), 1,1,1,2-tetrafluoro ethane (HFC-134a), 1,1-difluoroethane (HFC-152a), fluoroethane (HFC-161), 1,1,1,2,3,3,3-heptafluoropropane (HFC-227ea), 1,1,1,2,3,3-hexafluoropropane (HFC-236ea), 1,1,1,3,3,3-hexafluoropropane (HFC-236fa), 1,1,1,3,3-pentafluoropropane (HFC-245fa), and 1,1,1,3,3-pentafluorobutane (HFC-365mfc). Among them 1,1,1,2-tetrafluoroethane (HFC-134a) is preferable from the viewpoints of the stability of a refrigerating machine oil in an atmosphere of a refrigerant and reduction of GWP.

Examples of an unsaturated hydrofluorocarbon refrigerant include 1,2,3,3,3-pentafluoropropene (HFO-1225ye), 1,3,3,3-tetrafluoropropene (HFO-1234ze), 2,3,3,3-tetrafluoropropene (HFO-1234yf), 1,2,3,3-tetrafluoropropene (HFO-1234ye), and 3,3,3-trifluoropropene (HFO-1243zf). Among these, 1,3,3,3-tetrafluoropropene (HFO-1234ze) and 2,3,3,3-tetrafluoropropene (HFO-1234yf) are preferred, and 2,3,3,3-tetrafluoropropene (HFO-1234yf) is more preferred from the viewpoint of the stability of the refrigerating machine oil in a refrigerant atmosphere and from the viewpoint of reduction of GWP.

The content of difluoromethane may be preferably 5% by mass or more, more preferably 10% by mass or more, and further preferably 20% by mass or more based on the total amount of the refrigerant.

The content of a refrigerating machine oil in a working fluid composition for a refrigerating machine may be preferably 1 part by mass or more based on 100 parts by mass of a refrigerant, and more preferably 2 parts by mass or more; and may be preferably 500 parts by mass or less, and more preferably 400 parts by mass.

A refrigerating machine oil and a working fluid composition for a refrigerating machine are used advantageously in an air-conditioner, a refrigerator, or an open- or closed type car air-conditioner provided with a reciprocal or rotary closed type compressor. A refrigerating machine oil and a working fluid composition for a refrigerating machine are used advantageously in a cooling device, etc. such as a dehumidifier, a water heater, a freezer, a refrigerator/freezer storehouse, an automatic vending machine, a showcase, and a chemical plant. A refrigerating machine oil and a working fluid composition for a refrigerating machine are also used advantageously in a refrigerating machine provided with a centrifugal compressor.

EXAMPLES

The present invention will be described below more specifically based on Examples, provided that the present invention be not limited to the following Examples.

Refrigerating machine oils with compositions shown in Tables 2 and 3 were prepared using polyhydric alcohol fatty acid esters (base oils) shown in Table 1 and additives listed below. In the tables, the composition of each base oil is expressed by % by mass based on the total amount of the base oil, and the composition of each refrigerating machine oil is expressed by % by mass based on the total amount of the refrigerating machine oil.

TABLE 1

|  |  | Base oil No. | | |
| --- | --- | --- | --- | --- |
|  |  | A1 | A2 | A3 |
| Polyhydric | alcohol | Dipentaerythritol | Dipentaerythritol | Pentaerythritol |
| Fatty acid A | Type | 2-methylbutanoic acid | 2-methylbutanoic acid | n-heptanoic acid |
|  | Ratio (mol %) | 35 | 65 | 20 |
| Fatty acid B | Type | n-pentanoic acid | n-pentanoic acid | 3,5,5-trimethyl-hexanoic acid |
|  | Ratio (mol %) | 65 | 35 | 80 |
| Kinematic viscosity | 40° C. (mm$^2$/s) | 68 | 90 | 74 |
|  | 100° C. (mm$^2$/s) | 9.7 | 11 | 9.2 |

(Additives)
B1: Glycidyl neodecanoate
B2: 2-ethylhexyl glycidyl ether
B3: 1,2-epoxytetradecane The following stability test was conducted on each refrigerating machine oil, and the low-temperature deposition property were evaluated after the stability test. The results are shown in Tables 2 and 3.

(Stability Test)

First, a stability test was conducted according to JIS K2211: 2009 (Autoclave test). That is, 40 g of each refrigerating machine oil conditioned to a moisture content of 500 ppm was weighed into an autoclave, in which a catalyst (iron wire, copper wire, and aluminum wire, each having an outer diameter of 1.6 mm and a length of 50 mm) and 10 g of a difluoromethane (R32) refrigerant were placed and which was closed and then heated at 180° C. for 150 hours. After that, the acid value (JIS C 2101) of the refrigerating machine oil was measured.

(Low-Temperature Deposition Property after Stability Test)

10 g of each refrigerating machine oil having undergone the above stability test was put in a test tube, the test tube was immersed in an ethanol bath (−40° C.) containing dry ice for 6 hours, and whether the refrigerating machine oil became cloudy was observed.

TABLE 2

|  |  | Example 1 | Example 2 | Example 3 | Example 4 | Example 5 |
|---|---|---|---|---|---|---|
| Composition of base oil (% by mass) | A1 | 100 | — | 100 | — | — |
|  | A2 | — | 100 | — | 100 | 50 |
|  | A3 | — | — | — | — | 50 |
| Composition of refrigerating machine oil (% by mass) | Base oil | remainder | remainder | remainder | remainder | remainder |
|  | B1 | 0.1 | — | 3.0 | — | — |
|  | B2 | — | 0.5 | — | 5.0 | 2.0 |
|  | B3 | — | — | — | — | — |
| Stability test | Acid value (mgKOH/g) | 0.01 | 0.01 | 0.01 | 0.01 | 0.04 |
| Low-temperature deposition property after stability test | Presence or Absence of deposition | Absence | Absence | Absence | Absence | Absence |

TABLE 3

|  |  | Example 6 | Example 7 | Example 8 | Comp. Example 1 | Comp. Example 2 |
|---|---|---|---|---|---|---|
| Composition of base oil (% by mass) | A1 | — | 100 | — | 100 | 100 |
|  | A2 | 30 | — | 100 | — | — |
|  | A3 | 70 | — | — | — | — |
| Composition of refrigerating machine oil (% by mass) | Base oil | remainder | remainder | remainder | remainder | remainder |
|  | B1 | — | — | 0.1 | — | — |
|  | B2 | 2.0 | 0.1 | — | — | — |
|  | B3 | — | — | — | 3.0 | 0.5 |
| Stability test | Acid value (mgKOH/g) | 0.06 | 0.01 | 0.01 | 0.08 | 0.09 |
| Low-temperature deposition property after stability test | Presence or Absence of deposition | Absence | Absence | Absence | Presence | Presence |

TABLE 4

|  |  | Comp. Example 3 | Comp. Example 4 | Comp. Example 5 | Comp. Example 6 | Comp. Example 7 |
|---|---|---|---|---|---|---|
| Composition of base oil (% by mass) | A1 | — | 100 | — | — | — |
|  | A2 | — | — | 100 | — | — |
|  | A3 | 100 | — | — | 100 | 100 |
| Composition of refrigerating machine oil (% by mass) | Base oil | remainder | remainder | remainder | remainder | remainder |
|  | B1 | — | — | — | 0.5 | — |
|  | B2 | — | — | — | — | 0.5 |
|  | B3 | 0.5 | — | — | — | — |
| Stability test | Acid value (mgKOH/g) | 0.13 | 0.19 | 0.15 | 0.28 | 0.34 |
| Low-temperature deposition property after stability test | Presence or Absence of deposition | Presence | Absence | Absence | Absence | Absence |

The invention claimed is:

1. A refrigerating machine oil comprising:
a base oil comprising an ester of dipentaerythritol with 2-methylbutanoic acid and n-pentanoic acid; and
an epoxy compound consisting of at least one epoxy compound selected from the group consisting of a glycidyl ester compound and a glycidyl ether compound,
wherein the glycidyl ester compound is represented by the following formula (1):

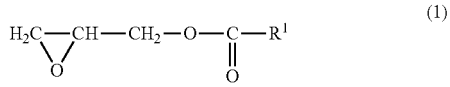

wherein $R^1$ represents an aryl group, an alkyl group, or an alkenyl group, and the number of carbon atoms of the aryl group, the alkyl group, and the alkenyl group is from 5 to 18, and
wherein the glycidyl ether compound is represented by the following formula (2):

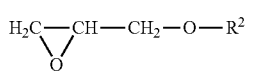

wherein $R^2$ represents an aryl group or an alkyl group, and the number of carbon atoms of the aryl group and the alkyl group is from 5 to 18.

2. The refrigerating machine oil according to claim 1, wherein a ratio of the ester in the base oil is 30% by mass or more and 100% by mass or less.

3. The refrigerating machine oil according to claim 1, wherein a content of the epoxy compound is 0.01% by mass or more and 5.0% by mass or less based on a total amount of the refrigerating machine oil.

4. A working fluid composition for a refrigerating machine, comprising:
a refrigerating machine oil comprising:
a base oil comprising an ester of dipentaerythritol with 2-methylbutanoic acid and n-pentanoic acid; and
an epoxy compound consisting of at least one epoxy compound selected from the group consisting of a glycidyl ester compound and a glycidyl ether compound; and
a refrigerant comprising a difluoromethane refrigerant,
wherein the glycidyl ester compound is represented by the following formula (1):

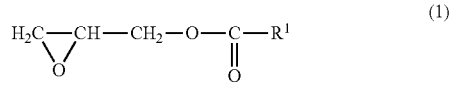
(1)

wherein $R^1$ represents an aryl group, an alkyl group, or an alkenyl group, and the number of carbon atoms of the aryl group, the alkyl group and alkenyl group is from 5 to 18, and
wherein the glycidyl ether compound is represented by the following formula (2):

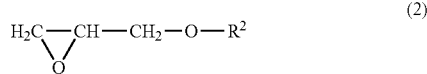
(2)

wherein $R^2$ represents an aryl group or an alkyl group, and the number of carbon atoms of the aryl group and the alkyl group is from 5 to 18.

5. The working fluid composition for a refrigerating machine according to claim 4, wherein a ratio of the ester in the base oil is 30% by mass or more and 100% by mass or less.

6. The working fluid composition for a refrigerating machine according to claim 4, wherein a content of the epoxy compound is 0.01% by mass or more and 5.0% by mass or less based on a total amount of the refrigerating machine oil.

7. The working fluid composition for a refrigerating machine according to claim 4, wherein a content of the epoxy compound is 0.1% by mass or more and 5.0% by mass or less based on a total amount of the refrigerating machine oil.

8. The working fluid composition for a refrigerating machine according to claim 7, wherein a ratio of the ester in the base oil is 30% by mass or more and 100% by mass or less.

9. The working fluid composition for a refrigerating machine according to claim 8, wherein a content of difluoromethane is 20% by mass or more based on the total amount of the refrigerant.

10. The working fluid composition for a refrigerating machine according to claim 8, wherein a ratio of the ester in the base oil is 50% by mass or more and 100% by mass or less.

11. The working fluid composition for a refrigerating machine according to claim 7, wherein a molar ratio between 2-methylbutanoic acid and n-pentanoic acid (2-methylbutanoic acid:n-pentanoic acid) in fatty acids constituting the ester is from 8:2 to 2:8.

12. The working fluid composition for a refrigerating machine according to claim 7, wherein a content of difluoromethane is 20% by mass or more based on the total amount of the refrigerant.

13. The working fluid composition for a refrigerating machine according to claim 4, wherein a molar ratio between 2-methylbutanoic acid and n-pentanoic acid (2-methylbutanoic acid:n-pentanoic acid) in fatty acids constituting the ester is from 8:2 to 2:8.

14. The working fluid composition for a refrigerating machine according to claim 4, wherein a content of difluoromethane is 20% by mass or more based on the total amount of the refrigerant.

* * * * *